(12) United States Patent
Suk et al.

(10) Patent No.: US 11,216,067 B2
(45) Date of Patent: Jan. 4, 2022

(54) METHOD FOR EYE-TRACKING AND TERMINAL FOR EXECUTING THE SAME

(71) Applicant: VisualCamp Co., Ltd., Seoul (KR)

(72) Inventors: Yun Chan Suk, Seoul (KR); Tae Hee Lee, Seoul (KR)

(73) Assignee: VisualCamp Co., Ltd., Seoul (KR)

( * ) Notice: Subject to any disclaimer, the term of this patent is extended or adjusted under 35 U.S.C. 154(b) by 0 days.

(21) Appl. No.: 17/040,256

(22) PCT Filed: Mar. 8, 2019

(86) PCT No.: PCT/KR2019/002753
§ 371 (c)(1),
(2) Date: Sep. 22, 2020

(87) PCT Pub. No.: WO2019/190076
PCT Pub. Date: Oct. 3, 2019

(65) Prior Publication Data
US 2021/0004082 A1    Jan. 7, 2021

(30) Foreign Application Priority Data
Mar. 28, 2018   (KR) .......................... 10-2018-0035690

(51) Int. Cl.
*G06F 3/01*    (2006.01)
*G06T 7/73*    (2017.01)
*G06K 9/00*    (2006.01)

(52) U.S. Cl.
CPC ......... *G06F 3/013* (2013.01); *G06K 9/00604* (2013.01); *G06T 7/73* (2017.01); *G06T 2207/30201* (2013.01)

(58) Field of Classification Search
CPC ........ G06F 3/013; G06T 7/73; G06K 9/00604
See application file for complete search history.

(56) References Cited

U.S. PATENT DOCUMENTS

2015/0278599 A1   10/2015   Zhang et al.
2018/0052514 A1    2/2018   Liu et al.
(Continued)

FOREIGN PATENT DOCUMENTS

| KR | 10-1288447 B1 | 7/2013 |
| KR | 10-2014-0132246 A | 11/2014 |
| KR | 10-2018-0025524 A | 3/2018 |

OTHER PUBLICATIONS

International Search Report for PCT/KR2019/002753 dated Jun. 7, 2019.

*Primary Examiner* — Edward Park
(74) *Attorney, Agent, or Firm* — The PL Law Group, PLLC

(57) ABSTRACT

A terminal according to an embodiment is for tracking eyes on the basis of a first eye tracking model in which multiple pieces of learning data related to line-of-sight information are accumulated. The terminal may include a data collecting unit which obtains a facial image of a user using an imaging device, and extracts line-of-sight information about the user from the facial image, a data transmitting unit which transmits, to a server, the line-of-sight information about the user and location information about a point to which a line of sight of the user is directed within a screen of the terminal; a model receiving unit which receives from the server a second eye tracking model obtained by training the first eye tracking model with the line-of-sight information and the location information, and an eye tracking unit which tracks eyes of the user using the second eye tracking model.

16 Claims, 4 Drawing Sheets

(56) References Cited

U.S. PATENT DOCUMENTS

2018/0053056 A1* 2/2018 Rabinovich .......... G06K 9/4628
2018/0133593 A1 5/2018 Wilson

* cited by examiner

METHOD FOR EYE-TRACKING AND TERMINAL FOR EXECUTING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/002753, filed Mar. 8, 2019, which claims priority to the benefit of Korean Patent Application No. 10-2018-0035690 filed in the Korean Intellectual Property Office on Mar. 28, 2018, the entire contents of which are incorporated herein by reference.

TECHNICAL FIELD

Embodiments of the present invention relate to an eye tracking technology.

BACKGROUND ART

Eye tracking is a technology that detects a user's eyeball movement to track a location of eyes, and methods such as an image analysis method, a contact lens method, and a sensor attachment method may be used. The image analysis method detects a pupil movement through an analysis of real-time camera image and calculates a direction of eyes based on a fixed location reflected on a cornea. The contact lens method uses reflected light from a mirror built-in contact lens, a magnetic field of a coil built-in contact lens, or the like, and is less convenient, but has higher accuracy. The sensor attachment method attaches a sensor around the eyes to detect an eyeball movement using a change in an electric field according to an eye movement, and can detect the eyeball movement even when the eyes are closed (sleep etc.).

In recent years, devices and fields targeted for application of an eye tracking technology are gradually expanding, and accordingly, attempts to utilize the eye tracking technology in providing an advertisement service on a terminal such as a smartphone or the like are increasing. Furthermore, application cases in which various services are provided by combining deep learning-based artificial intelligence and an eye tracking technology are increasing.

However, users may have different eyeball movements, and thus may have slightly different gaze patterns in which a particular point is gazed at. Therefore, it is difficult to implement an eye tracking model optimized for a user only using uniform gaze information, and the accuracy of eye tracking may decrease.

SUMMARY

Embodiments of the present invention are for improving the accuracy of eye tracking by tracking eyes of a user using an eye tracking model optimized for the user.

A terminal according to an embodiment of the present invention is a terminal for tracking eyes on the basis of a first eye tracking model in which multiple pieces of learning data related to line-of-sight information are accumulated, and includes: a data collecting unit, which obtains a facial image of a user using an imaging device, and extracts line-of-sight information about the user from the facial image; a data transmitting unit, which transmits, to a server, the line-of-sight information about the user and location information about a point, to which a line of sight of the user is directed, within a screen of the terminal; a model receiving unit, which receives, from the server, a second eye tracking model obtained by training the first eye tracking model with the line-of-sight information about the user and the location information; and an eye tracking unit, which tracks eyes of the user using the second eye tracking model.

The second eye tracking model may be generated by performing training by giving different preset weight values to the accumulated learning data and the line-of-sight information about the user and the location information and inputting the weighted learning data, line-of-sight information about the user, and location information to the first eye tracking model.

The second eye tracking model may vary for each user.

The first eye tracking model or the second eye tracking model to which the line-of-sight information about the user and the location information are applied may be distributed from the server to another terminal.

When the user gazes at a plurality of points within the screen of the terminal, the data collecting unit may extract the line-of-sight information about the user from each of facial images of the user captured at times at which the user gazes at the points, and the data transmitting unit may transmit the line-of-sight information about the user and the location information about each of the points to the server.

When an input of a set action is received from the user gazing at the point within the screen, the data collecting unit may determine a time at which the action is received as a time at which the user gazes at the point.

The time at which the action is received may include at least one of a time at which the user touches the point and a time at which the user starts to give utterance in response to a set wording displayed at the point.

An eye tracking method according to an embodiment of the present invention is a method performed in a terminal for tracking eyes on the basis of a first eye tracking model in which multiple pieces of learning data related to line-of-sight information are accumulated, and includes the steps of: obtaining a facial image of a user using an imaging device; extracting line-of-sight information about the user from the facial image; transmitting, to a server, the line-of-sight information about the user and location information about a point, to which a line of sight of the user is directed, within a screen of the terminal; receiving, from the server, a second eye tracking model obtained by training the first eye tracking model with the line-of-sight information about the user and the location information; and tracking eyes of the user using the second eye tracking model.

The second eye tracking model may be generated by performing training by giving different preset weight values to the accumulated learning data and the line-of-sight information about the user and the location information and inputting the weighted learning data, line-of-sight information about the user, and location information to the first eye tracking model.

The second eye tracking model may vary for each user.

The first eye tracking model or the second eye tracking model to which the line-of-sight information about the user and the location information are applied may be distributed from the server to another terminal.

In the step of extracting, when the user gazes at a plurality of points within the screen of the terminal, the line-of-sight information about the user may be extracted from each of facial images of the user captured at times at which the user gazes at the points, and in the step of transmitting, the line-of-sight information about the user and the location information about each of the points may be transmitted to the server.

In the step of extracting, when an input of a set action is received from the user gazing at the point within the screen, a time at which the action is received may be determined as a time at which the user gazes at the point.

The time at which the action is received may include at least one of a time at which the user touches the point and a time at which the user starts to give utterance in response to a set wording displayed at the point.

A computing device according to an embodiment of the present invention includes: one or more processors; a memory; and one or more programs, wherein the one or more programs are stored in the memory and configured to be executed by the one or more processors, wherein the one or more programs include: instructions for receiving, from a terminal, line-of-sight information about a user and location information about a point, to which a line of sight of the user is directed, within a screen of the terminal; instructions for generating a second eye tracking model trained with the line-of-sight information about the user and the location information on the basis of a first eye tracking mode in which multiple pieces of learning data related to line-of-sight information are accumulated; and instructions for transmitting the second eye tracking model to the terminal.

The second eye tracking model may be generated by performing training by giving different preset weight values to the accumulated learning data and the line-of-sight information about the user and the location information and inputting the weighted learning data, line-of-sight information about the user, and location information to the first eye tracking model.

According to embodiments of the present invention, line-of-sight information about a user is input to an eye tracking model in which multiple pieces of learning data are accumulated, and the eye tracking model is trained with the input information to newly generate the eye tracking model optimized for the user, and the eyes of the user is tracked through this model, thereby improving the accuracy of eye tracking.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only for illustrative purpose and the present invention is not limited thereto.

In describing the embodiments of the present invention, when it is determined that detailed descriptions of known technology related to the present invention may unnecessarily obscure the gist of the present invention, the detailed descriptions thereof will be omitted. The terms used below are defined in consideration of functions in the present invention, but may be changed depending on the customary practice or the intention of a user or operator. Thus, the definitions should be determined based on the overall content of the present disclosure. The terms used herein are only for describing the embodiments of the present invention, and should not be construed as limitative. Unless expressly used otherwise, a singular form includes a plural form. In the present disclosure, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
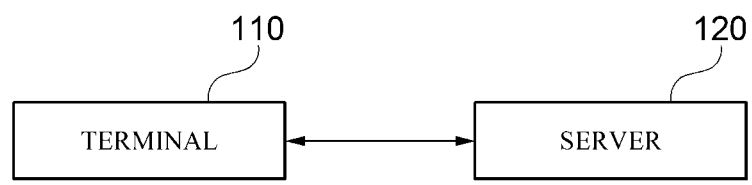
FIG. 1 is a block diagram illustrating a detailed configuration of an eye tracking system according to an embodiment of the present invention.

FIG. 1 is a block diagram illustrating a detailed configuration of an eye tracking system 100 according to an embodiment of the present invention.

Referring to FIG. 1, the eye tracking system 100 according to an embodiment of the present invention includes a terminal 110 and a server 120.

The terminal 110 according to an embodiment of the present invention may be a device capable of tracking eyes of a user, for example, a mobile device such as a smartphone, a tablet PC, a laptop, etc. However, the type of the terminal 110 is not limited thereto, and various communication devices having a screen for displaying a variety of content and an imaging device (not shown) for capturing an image of a user may correspond to the terminal 110 according to embodiments of the present invention.

The terminal 110 may track eyes on the basis of a first eye tracking model in which multiple pieces of learning data related to line-of-sight information are accumulated. The first eye tracking model is a model used for tracking eyes of a user on the basis of the learning data, for example, may be a deep learning model. The deep learning model may be, for example, a convolutional neural network (CNN) model. Furthermore, the terminal 110 may obtain various data for tracking eyes using not only the first eye tracking model but also a rule-based algorithm such as a pre-defined video processing technique, image processing technique, and mathematical expression. The rule-based algorithm may be, for example, a face recognition algorithm (e.g., principal component analysis (PCA), linear discriminant analysis (LDA), and the like), a facial feature point detection algorithm (e.g., support vector machine (SVM), speeded up robust features (SURF), and the like), an image-based head-tracking algorithm, a pupil extraction and pupil location coordinate calculation algorithm, and the like.

Here, the terminal 110 may obtain a facial image of a user using an imaging device (not shown), and may extract line-of-sight information about the user from the facial image. Furthermore, the terminal 110 may track the eyes of the user on the basis of the first eye tracking mode to obtain location information about a point, to which a line of sight of the user is directed, within a screen of the terminal 110. The terminal 110 may transmit the line-of-sight information about the user and the location information to the server 120.

Here, the server 120 may apply the line-of-sight information about the user and the location information to the first eye tracking model to generate the first eye tracking model having improved accuracy. Furthermore, the server 120 may repeatedly train the first eye tracking model with the line-of-sight information about the user and the location information to generate a second eye tracking model, and may transmit the second eye tracking model to the terminal 110. The second eye tracking model, which is a model optimized for tracking eyes of a user, may be generated on the basis of the first eye tracking model.

In detail, the second eye tracking model may be a model obtained by repeatedly train the first eye tracking model, in which multiple pieces of learning data are accumulated, with the line-of-sight information about the user and the location information so that the first eye tracking model is weight-trained with characteristics of the user, i.e., a gaze pattern of the user. For example, the second eye tracking model may be generated by performing training by giving different preset weight values to the accumulated learning data and the line-of-sight information about the user and the location information (i.e., user data) and inputting the weighted learning data, line-of-sight information about the user, and location information to the first eye tracking model.

The terminal 110 may receive the second eye tracking model from the server 120, and may track the eyes of the user using the second eye tracking model. Here, the second eye tracking model may vary for each user (or each terminal). The terminal may track the eyes of a user using an eye tracking model optimized for the user, and thus the accuracy of eye tracking may be improved.

The server 120 may be connected to the terminal 110 via a network (not shown). The server 120 may transmit the first eye tracking mode that is a basic eye tracking model to the first terminal 110 in response to a request from the terminal 110. Furthermore, the server 120 may receive, from the terminal 110, the line-of-sight information about a user and the location information, and may generate the first eye tracking model having improved accuracy (i.e., an improved first eye tracking model) and the second eye tracking model using the line-of-sight information about a user and the location information. Here, the server may generate the second eye tracking model for each user.

In detail, the server 120 may generate the second eye tracking model by repeatedly training the first eye tracking model, in which multiple pieces of learning data are accumulated, with the line-of-sight information about a user and the location information at least a set number of times. The server 120 may transmit the generated second eye tracking model to the terminal 110, and the terminal 110 may track the eyes of a user using the second eye tracking model. Furthermore, the server 120 may distribute the improved first eye tracking model and the second eye tracking model to another terminal (not shown), and the other terminal may transmit, to the server 120, the line-of-sight information about another user and the location information about a point, to which a line of sight of the other user is directed, within a screen of the other terminal. Through this process, accuracy of the first eye tracking model and the second eye tracking model may be improved gradually.

Figure 2:
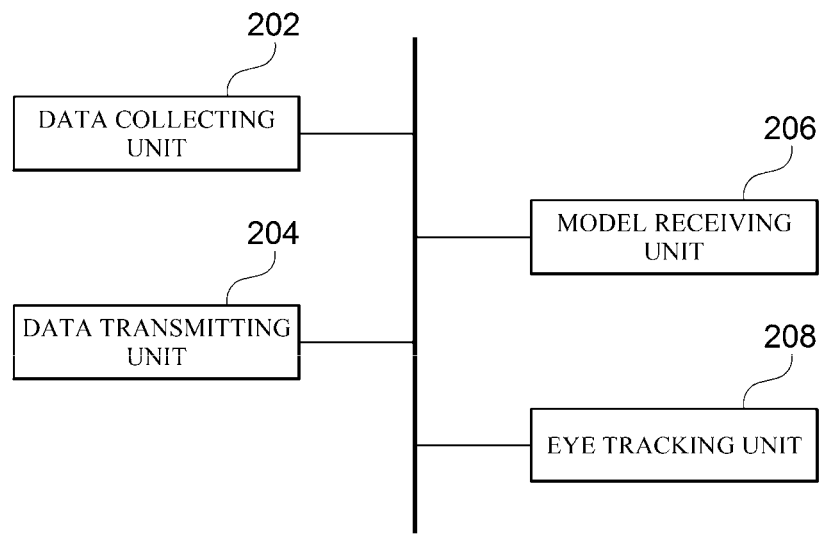
FIG. 2 is a block diagram illustrating a detailed configuration of a terminal according to an embodiment of the present invention.

FIG. 2 is a block diagram illustrating a detailed configuration of the terminal 110 according to an embodiment of the present invention.

Referring to FIG. 2, the terminal 110 according to an embodiment of the present invention includes a data collecting unit 202, a data transmitting unit 204, a model receiving unit 206, and an eye tracking unit 208.

The data collecting 202 obtains a facial image of a user using an imaging device, and extracts the line-of-sight information about the user from the facial image. Here, the imaging device may be, for example, a camera, a camcorder, or the like, and may be provided to one side of the terminal 110. The data collecting unit 202 may extract a face region and eye region of a user using various rule-based algorithms, and may collect various data such as a facial image and location coordinates, a pupil image and location coordinates, and a direction vector of a pupil from the face region and the eye region. The collected line-of-sight information about a user is used for generating the second eye tracking model described below, and may be obtained, for example, from facial images of the user captured at multiple angles when an application (not shown) for tracking eyes is initially driven. However, the time at which the line-of-sight information about a user is collected is not limited thereto, and thus the data collecting unit 202 may frequently collect the line-of-sight information about a user using the imaging device while the application is running.

Furthermore, the data collecting unit 202 may interwork with the eye tracking unit 208 described below so as to obtain location information mapped to the line-of-sight information about a user, i.e., the location information about a point, to which a line of sight of the user is directed, within the screen of the terminal 110. For example, when the user gazes at a point X within the screen, the data collecting unit 202 may obtain the line-of-sight information about the user gazing at the point X and the location information (e.g., location coordinates) about the point X.

Here, when the user gazes at a plurality of set points within the screen of the terminal 110, the data collecting unit 202 may extract the line-of-sight information about the user from each of facial images of the user captured at the times at which the user gazes at the points. Furthermore, in this case, the data collecting unit 202 may obtain the location information about each of the points.

To this end, the data collecting unit 202 may output, to the screen, a message having contents that induce the user to gaze at a particular point within the screen of the terminal 110. Therefore, the user may gaze at the particular point (e.g., the upper side, lower side, left side, or right side of the screen), and, in this case, the data collecting unit 202 may extract the line-of-sight information about the user from the facial image of the user captured at the time at which the user gazes at the particular point.

Furthermore, the data collecting unit 202 may receive an input of a set action from the user gazing at the point within the screen in order to more accurately determine a gaze time of the user, and may determine the time at which the action is received as the time at which the user gazes at the point. Here, the time at which the action is received may include at least one of the time at which the user touches the point and the time at which the user starts to give utterance in response to a set wording displayed at the point.

For example, when the user touches a region A while gazing at the region A, the data collecting unit 202 may extract the line-of-sight information about the user from the facial image of the user captured at the time at which the user touches the region A. Here, the data collecting unit 202 may drive the imaging device at the time at which the user touches the region A in order to minimize battery consumption of the terminal 110. That is, the imaging device of the terminal 110 may not be driven at a normal time, and may be driven to capture an image of a user when the user touches a set point.

For another example, the data collecting unit 202 may display a set wording (e.g., "say your name") in the region A, and, when the user gives utterance in response to the wording, may extract the line-of-sight information about the user from the facial image of the user captured at the time at which the utterance starts.

The data transmitting unit 204 transmits, to the server 120, the line-of-sight information about the user extracted by the data collecting unit 202 and the location information about a point, to which the line of sight of the user is directed, within the screen of the terminal 110. Here, a wireless communication method such as Wi-Fi, Zigbee, Bluetooth, or the like in order to transmit the line-of-sight information about the user and the location information, but the present invention is not limited thereto, and thus various types of wireless communication methods may be used.

The model receiving unit 206 receives the first eye tracking model from the server 120. As described above, the first eye tracking model is a deep learning-based model in which multiple pieces of learning data related to line-of-sight information are accumulated, and the terminal 110 may track eyes of a user on the basis of the first eye tracking model.

Furthermore, the model receiving unit 206 may receive the second eye tracking model from the server 120. As described above, the second eye tracking model may be a model obtained by repeatedly train the first eye tracking model, in which multiple pieces of learning data are accumulated, with the line-of-sight information about the user and the location information so that the first eye tracking model is weight-trained with characteristics of the user, i.e., the gaze pattern of the user. In an example embodiment, the second eye tracking model may be generated by performing training by giving a weight value of 0.2 to the accumulated learning data and a weight value of 0.8 to the line-of-sight information about the user and the location information and inputting the weighted learning data, line-of-sight information about the user, and location information to the first eye tracking model.

The eye tracking unit 208 tracks the eyes of the user using the first eye tracking model or the second eye tracking model. The eye tracking unit 208 may track the eyes of the user using the first eye tracking model, and may also track the eyes of the user using the second eye tracking model optimized for the user in order to improve the accuracy of eye tracking.

Figure 3:
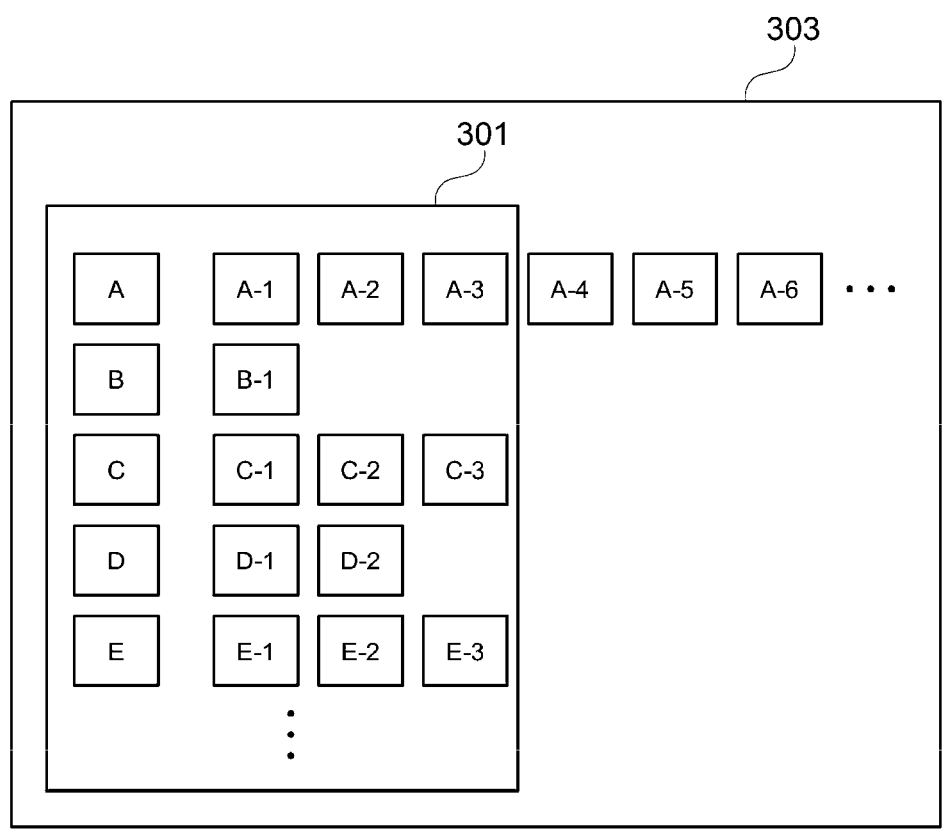
FIG. 3 is an exemplary diagram illustrating a process of generating a second eye tracking model according to an embodiment of the present invention.

FIG. 3 is an exemplary diagram illustrating a process of generating a second eye tracking model 303 according to an embodiment of the present invention.

Referring to FIG. 3, a first eye tracking model 301 is generated by accumulating multiple pieces of learning data related to line-of-sight information on the basis of deep learning. For example, the first eye tracking model 301 may be a model for tracking the eyes of a user on the basis of learning data including a plurality of pieces of line-of-sight information (e.g., A-1 to A-3, B-1, C-1 to C-3, D-1, D-2, E-1 to E-3) collected from arbitrary users (e.g., users A, B, C, D, and E).

Furthermore, the second eye tracking model 303 may be generated by giving different set weight values to the learning data, the line-of-sight information about users, and the location information and inputting the weighted learning data, line-of-sight information about users, and location information to the first eye tracking model 301. Here, the second eye tracking model may vary for each user. For example, when the second eye tracking model 303 is presumed to be an eye tracking model for the user A, the server 120 may receive the line-of-sight information (A-1, A-2, A-3, A-4, A-5, A-6) (and the location information) about the user A from the terminal 110, and may repeatedly train the first eye tracking model 301 with the line-of-sight information (and the location information) about the user A. The server 120 may generate the second eye tracking model 303 by repeatedly training the first eye tracking model with the line-of-sight information (and the location information) about the user A and the pre-accumulated learning data after giving a weight value of 0.8 and a weight value of 0.2 to the line-of-sight information (and the location information) and the pre-accumulated learning data respectively. The second eye tracking model 303 generated through this process is an optimized model for the user A, and may be used during a process of tracking the eyes of the user A.

The above-mentioned weight values 0.8 and 0.2 are merely examples, and may be changed according to an embodiment.

Figure 4:
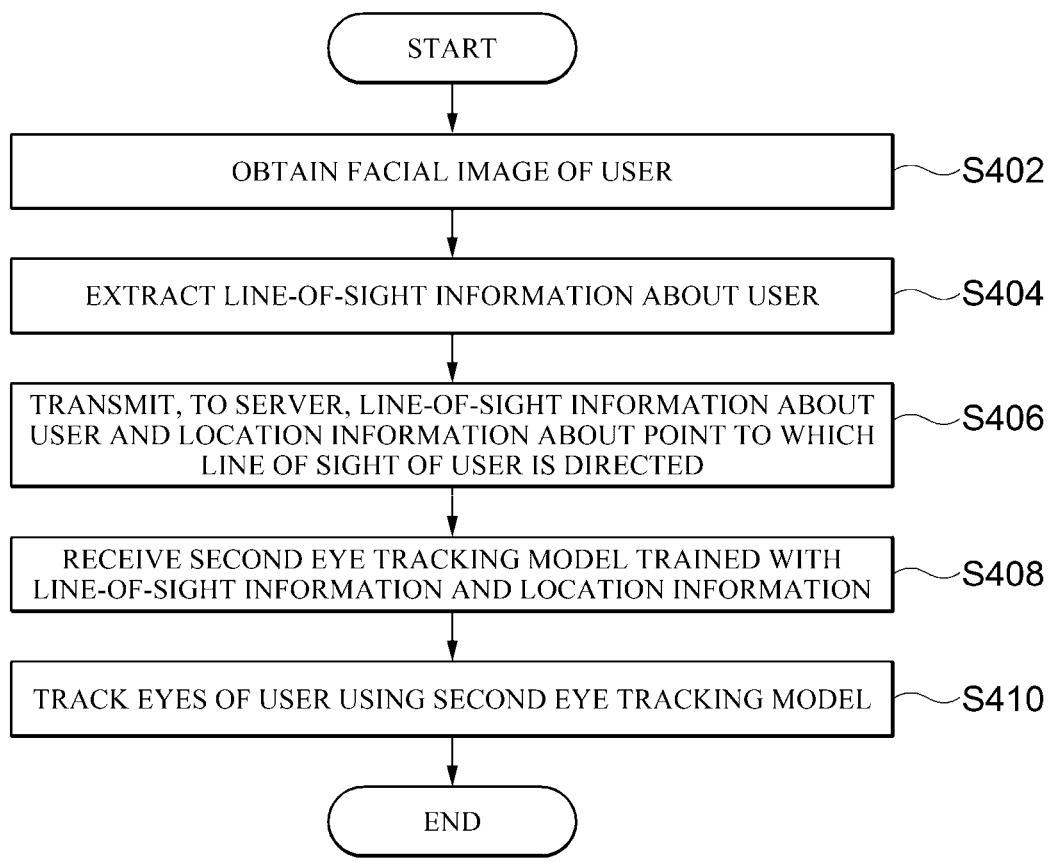
FIG. 4 is a flowchart illustrating an eye tracking method according to an embodiment of the present invention.

FIG. 4 is a flowchart illustrating an eye tracking method 400 according to an embodiment of the present invention. The method illustrated in FIG. 4 may be performed by, for example, the terminal 110 illustrated in FIG. 2.

The terminal 110 obtains a facial image of a user using an imaging device (S402).

Next, the terminal 110 extracts line-of-sight information about the user from the facial image captured by the imaging device (S404). Here, when the user gazes at a plurality of set points within the screen of the terminal 110, the terminal may 110 may extract the line-of-sight information about the user from each of facial images of the user captured at the times at which the user gazes at the points. Furthermore, the line-of-sight information about the user may include location information about each point.

Next, the terminal 110 transmits, to the server 120, the extracted line-of-sight information about the user and the location information about a point, to which the line of sight of the user is directed, within the screen of the terminal 110 (S406).

Next, the terminal 110 receives the second eye tracking model 303 from the server 120 (S408). The second eye tracking model 303 may be generated by giving different set weight values to the learning data, the line-of-sight information about users, and the location information and inputting the weighted learning data, line-of-sight information about users, and location information to the first eye tracking model 301.

Next, the terminal 110 tracks the eyes of the user using the second eye tracking model 303 received from the server 120 (S410).

Although the above method is divided into a plurality of operations in the flowchart illustrated in FIG. 4, at least some of the operations may be performed by changing the order of the operations, may be performed in combination with other operations, may be skipped, may be divided into detailed operations, or may be performed by adding at least one operation which is not shown.

Figure 5:
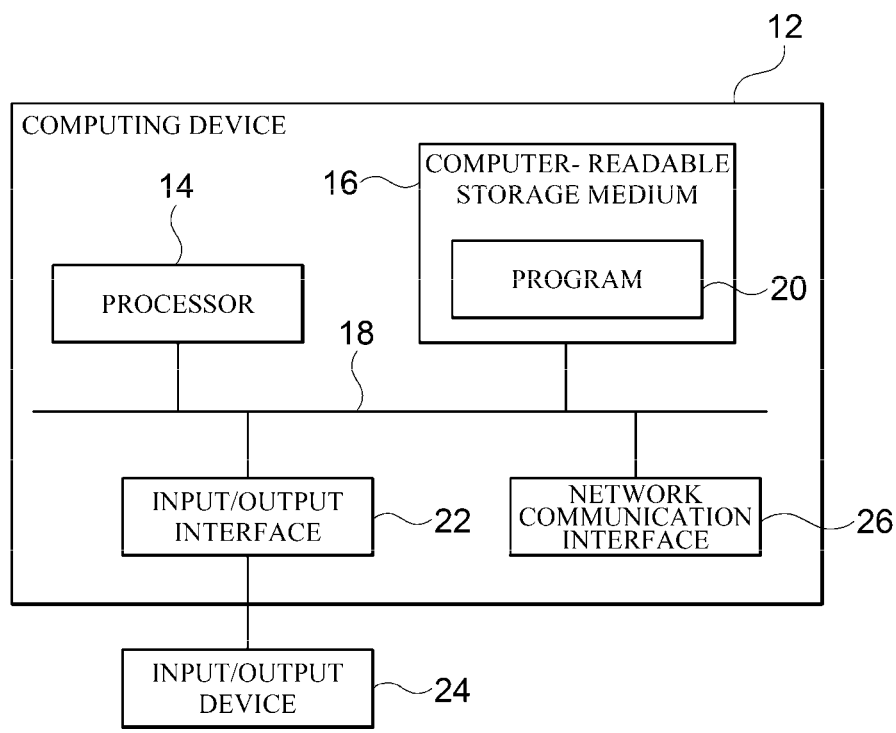
FIG. 5 is a block diagram exemplarily illustrating a computing environment that includes a computing device suitable for use in exemplary embodiments.

FIG. 5 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device may be the eye tracking system 100 or one or more components included in the eye tracking system 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 may include a scroll screen, an input interface, and an input screen. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the representative embodiments of the present invention have been described in detail as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

The invention claimed is:

1. A terminal for tracking eyes on the basis of a first eye tracking model in which multiple pieces of learning data related to line-of-sight information are accumulated, the terminal comprising:
   a data collecting unit, which obtains a facial image of a user using an imaging device, and extracts line-of-sight information about the user from the facial image;
   a data transmitting unit, which transmits, to a server, the line-of-sight information about the user and location information about a point, to which a line of sight of the user is directed, within a screen of the terminal;
   a model receiving unit, which receives, from the server, a second eye tracking model obtained by training the first eye tracking model with the line-of-sight information about the user and the location information; and
   an eye tracking unit, which tracks eyes of the user using the second eye tracking model.

2. The terminal of claim 1, wherein the second eye tracking model is generated by performing training by giving different preset weight values to the accumulated learning data and the line-of-sight information about the user and the location information and inputting the weighted learning data, line-of-sight information about the user, and location information to the first eye tracking model.

3. The terminal of claim 1, wherein the second eye tracking model varies for each user.

4. The terminal of claim 1, wherein the first eye tracking model or the second eye tracking model to which the line-of-sight information about the user and the location information are applied is distributed from the server to another terminal.

5. The terminal of claim 1,
   wherein, when the user gazes at a plurality of points within the screen of the terminal, the data collecting unit extracts the line-of-sight information about the user from each of facial images of the user captured at times at which the user gazes at the points, and
   the data transmitting unit transmits the line-of-sight information about the user and the location information about each of the points to the server.

6. The terminal of claim 5, wherein, when an input of a set action is received from the user gazing at the point within the screen, the data collecting unit determines a time at which the action is received as a time at which the user gazes at the point.

7. The terminal of claim 6, wherein the time at which the action is received comprises at least one of a time at which the user touches the point and a time at which the user starts to give utterance in response to a set wording displayed at the point.

8. An eye tracking method performed in a terminal for tracking eyes on the basis of a first eye tracking model in which multiple pieces of learning data related to line-of-sight information are accumulated, the method comprising the steps of:
   obtaining a facial image of a user using an imaging device;
   extracting line-of-sight information about the user from the facial image;
   transmitting, to a server, the line-of-sight information about the user and location information about a point, to which a line of sight of the user is directed, within a screen of the terminal;
   receiving, from the server, a second eye tracking model obtained by training the first eye tracking model with the line-of-sight information about the user and the location information; and
   tracking eyes of the user using the second eye tracking model.

9. The eye tracking method of claim 8, wherein the second eye tracking model is generated by performing training by giving different preset weight values to the accumulated learning data and the line-of-sight information about the user and the location information and inputting the weighted learning data, line-of-sight information about the user, and location information to the first eye tracking model.

10. The eye tracking method of claim 8, wherein the second eye tracking model varies for each user.

11. The eye tracking method of claim 8, wherein the first eye tracking model or the second eye tracking model to which the line-of-sight information about the user and the location information are applied is distributed from the server to another terminal.

12. The eye tracking method of claim 8,
    wherein, in the step of extracting, when the user gazes at a plurality of points within the screen of the terminal, the line-of-sight information about the user is extracted from each of facial images of the user captured at times at which the user gazes at the points, and in the step of transmitting, the line-of-sight information about the user and the location information about each of the points are transmitted to the server.

13. The eye tracking method of claim 12, wherein, in the step of extracting, when an input of a set action is received from the user gazing at the point within the screen, a time at which the action is received is determined as a time at which the user gazes at the point.

14. The eye tracking method of claim 13, wherein the time at which the action is received comprises at least one of a time at which the user touches the point and a time at which the user starts to give utterance in response to a set wording displayed at the point.

15. A computing device comprising:
one or more processors;
a memory; and
one or more programs,
wherein the one or more programs are stored in the memory and configured to be executed by the one or more processors,
wherein the one or more programs comprise:
instructions for receiving, from a terminal, line-of-sight information about a user and location information about a point, to which a line of sight of the user is directed, within a screen of the terminal;
instructions for generating a second eye tracking model trained with the line-of-sight information about the user and the location information on the basis of a first eye tracking mode in which multiple pieces of learning data related to line-of-sight information are accumulated; and
instructions for transmitting the second eye tracking model to the terminal.

16. The computing device of claim 15, wherein the second eye tracking model is generated by performing training by giving different preset weight values to the accumulated learning data and the line-of-sight information about the user and the location information and inputting the weighted learning data, line-of-sight information about the user, and location information to the first eye tracking model.

* * * * *